United States Patent [19]

Shibata

[11] 3,918,924

[45] Nov. 11, 1975

[54] METHOD FOR PRODUCING WEAR-RESISTANT FERROUS SINTERED METAL CONTAINING HIGH AMOUNTS OF TITANIUM CARBIDE GRAINS AND CARBON PARTICLES

[75] Inventor: Akira Shibata, Yokohama, Japan

[73] Assignee: Chugai Electric Co., Tokyo, Japan

[22] Filed: Sept. 18, 1973

[21] Appl. No.: 398,390

Related U.S. Application Data

[62] Division of Ser. No. 262,281, June 13, 1972, Pat. No. 3,782,930.

[52] U.S. Cl................................ 29/182.8; 75/204
[51] Int. Cl.² ........................................... C22C 1/10
[58] Field of Search .......... 29/182.7, 182.8; 75/203, 75/204

[56] References Cited
UNITED STATES PATENTS
3,720,504   3/1973   Frehn................. 75/204 X

*Primary Examiner*—Benjamin R. Padgett
*Assistant Examiner*—R. E. Schafer
*Attorney, Agent, or Firm*—Hopgood, Calimafde, Kalil, Blaustein and Lieberman

[57] ABSTRACT

A sintered graphite-containing ferrous-titanium carbide composition is provided which is produced by a liquid phase sintering process, wherein a powder composition comprising a mixture of iron, titanium (e.g. ferro-titanium), cast iron and carbon is pressed into a compact and the compact then heated to above the melting point of the cast iron such that the carbon in the melt reacts with the titanium to form titanium carbide, the amount of carbon being also sufficient to form graphite, such that on cooling, a metallographic structure is obtained comprised of fine grains of precipitated titanium carbide dispersed in a ferrous matrix which also contains precipitated particles of graphite.

6 Claims, 8 Drawing Figures

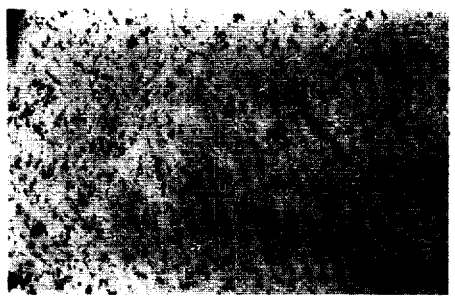
FIG.1 X150
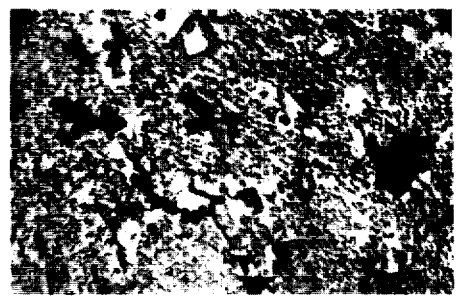
FIG.2 X1500
FIG.3 X150
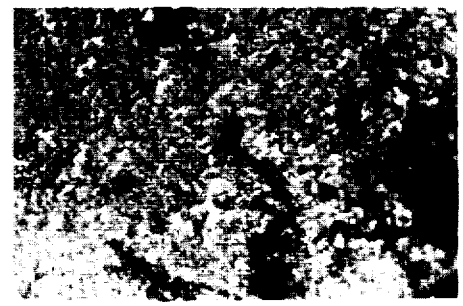
FIG.4 X1500
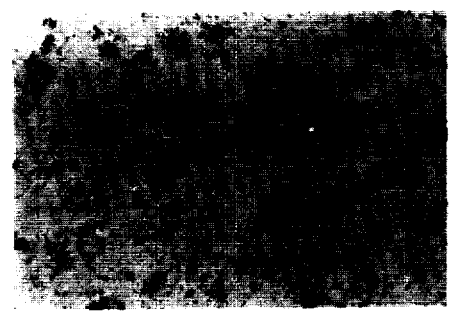
FIG.5 X150
FIG.6 X1500
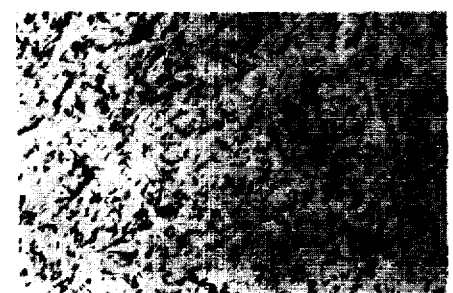
FIG.7 X150
FIG.8 X1500

3,918,924

METHOD FOR PRODUCING WEAR-RESISTANT FERROUS SINTERED METAL CONTAINING HIGH AMOUNTS OF TITANIUM CARBIDE GRAINS AND CARBON PARTICLES

This is a division of copending application Ser. No. 262,281 filed June 13, 1972 now U.S. Pat. No. 3,782,930.

This invention relates to a method for producing a scuff and wear-resistant sintered ferrous-titanium carbide composition having a microscopic or metallographic structure in which fine grains of precipitated titanium carbide and particles of graphite are dispersed substantially throughout a ferrous matrix.

By "ferrous-titanium carbide" composition is meant a sintered composition in which grains of titanium carbide are dispersed through a ferrous matrix in which iron predominates.

State of the Art

It is known to produce sintered ferrous-titanium carbide compositions by mixing primary grains of titanium carbide with steel-forming ingredients, such as powdered iron, carbon and certain alloying elements, e.g. chromium, molybdenum, etc., compacting the mixture into a desired shape and then sintering the shape, generally in a vacuum, at an elevated temperature of about 1450°C at which a liquid phase exists. The sintering is carried out for about one-half hour at the aforementioned temperature and the shape cooled to room temperature. If the shape is furnace-cooled slowly, a microstructure is obtained comprising primary grains of titanium carbide dispersed through a pearlitic matrix. As the titanium carbide grains tend to grow during sintering at the aforementioned temperature (1450°C), the grain size of the carbide may vary anywhere from about 5 to 15 or 20 microns. Such a sintered composition exhibits good wear resistance. However, such composition, because of its intrinsic hardness, may tend to scratch the surface against which an element of said composition is rubbing.

It would be desirable, therefore, to provide a ferrous-titanium carbide composition which not only resists wear, but also is resistant to scuffing. In particular, it would be desirable to have a composition which is self-lubricating and can be used as apex seals in rotary piston engines without substantially subjecting the housing of the engine to undue wear. Presently, such housings are made from an aluminum alloy.

Objects of the Invention

It is thus the object of the invention to provide a method for producing a sintered ferrous-titanium carbide composition having an improved metallographic structure, such that while it has improved resistance to wear, it will less likely scratch an opposing surface against which it is rubbing.

Another object is to provide a method for producing the aforementioned sintered composition so that it has self-lubricating properties.

A still further object is to provide a sintered ferrous-titanium carbide composition having improved resistance to wear and which is self-lubricating.

As an additional object, the invention also provides as an article of manufacture, a wear and scuff-resistant element comprising said improved sintered ferrous-titanium carbide composition.

These and other objects will more clearly appear when taken in conjunction with the following disclosure and the accompanying drawing, wherein:

FIGS. 1 and 2 are photomicrographs of a sintered structure produced in accordance with the invention with respect to Example 1 herein, the photomicrographs being taken at 150 and 1500 times magnification, respectively;

FIGS. 3 and 4 are photomicrographs of a sintered structure produced in accordance with the invention as described hereinafter in Example 3, the photomicrographs being similarly taken at 150 and 1500 times magnification, respectively;

FIGS. 5 and 6 are photomicrographs at 150 and 1500 times magnification, respectively, showing the structure of a sintered composition produced in accordance with Example 4 of the invention; and FIGS. 7 and 8 are photomicrographs also taken at 150 and 1500 times magnification, respectively, showing the structure of a sintered composition produced in accordance with Example 5 of the invention.

Statement of the Invention

Broadly speaking, the method aspect of the invention is directed to the production of a sintered wear and scuff-resistant ferrous-titanium carbide composition comprising, providing an iron-containing powder mixture containing the ingredients carbon and titanium, at least a substantial portion of the iron present being in the form of cast iron, the amount of carbon added together with carbon in the cast iron being at least sufficient to combine with titanium to form titanium carbide and also provide excess carbon to form graphite on cooling from a liquid phase of the mixture during sintering, pressing the powder mixture into a compact, sintering the compact at a liquid phase temperature above the melting point of the contained cast iron, whereby to form titanium carbide by precipitation, and then cooling said sintered compact to below the liquid phase temperature, whereby to precipitate carbon as graphite and provide a metallographic structure characterized by fine grains of precipitated titanium carbide and fine particles of graphite dispersed through a ferrous matrix.

In a preferred embodiment, the starting ingredients may comprise a powder mixture of a ferro-titanium alloy, cast iron and carbon. The mixture is pressed into a compact and the compact heated to an elevated temperature, e.g. 1100°C to 1400°C, preferably from about 1200°C to 1300°C, such as 1250°C, the temperature being sufficient to melt the cast iron and produce a liquid phase from which fine grains of titanium carbide are precipitated, free carbon as graphite being thereafter precipitated by cooling the compact slowly.

According to the method, the titanium carbide is precipitated during the first step of liquid phase sintering, and the carbon is precipitated as graphite during the second step involving cooling of the sintered compact. The titanium carbide precipitation is completed at the end of the first step, that is, at the end of the sintering step. The carbide precipitation is effected by the reaction between the titanium contained in the mixture (e.g. ferro-titanium) and the carbon in the molten cast iron, including the free carbon which dissolves in the cast iron.

The size of the precipitated titanium carbide grains is very small and is substantially below 5 microns, and generally usually of the order of about 1 micron. Because a low sintering temperature is used (1250°C), the rate of grain growth or growing velocity of the grains is quite small. The advantage of using cast iron as part of the powder mixture is that it enables the use of sintering temperatures substantially below 1450°C and this enables the precipitation of very fine sizes of titanium carbide grains due to the much lower rate of grain growth.

In this connection, the invention provides an interesting comparison with a sintered ferrous-titanium carbide composition sold under the trademark FERRO-TIC "C" comprising essentially a composition of about 33% by weight of titanium carbide (45 volume percent) and the balance a steel containing about 3% chromium, about 3% molybdenum, about 0.5% carbon and the balance essentially iron. Compositions of this type are covered by U.S. Pat. No. 2,828,202. The aforementioned composition is produced by powder metallurgy by forming a compact or briquet form a powder mixture of titanium carbide and steel-forming ingredients and sintering the compact at 1450°C. The starting particle size of the titanium carbide powder is very small and is of the order of about 1 to 3 microns. Since the liquid phase sintering temperature is rather high (1450°C), the rate of grain growth or growing velocity of titanium carbide is relatively large, such that following completion of sintering, the final grain size is greatly increased and may be of the order of about 10 to 20 microns. Even where the starting grain size is less than 1 micron, large grains of the order of 10 to 20 microns may be obtained.

As stated hereinbefore, by utilizing the invention, very fine grains of titanium carbide are obtained having generally an average size of about 1 micron, the microstructure comprising a dense precipitate of titanium carbide grains resulting from the first step of sintering, and then following the second step (cooling), a dispersion of graphitic carbon distributed through the ferrous matrix and around the grains of titanium carbide. The size of the dispersed graphite is also very small and is generally less than 10 microns.

Ferro-titanium is preferred as a starting ingredient with cast iron. However, other metal powders may be included as alloying agents, such as small amounts of molybdenum, copper, chromium, silicon, manganese and the like. Thus, where reference is made to a "ferrous matrix" or to the expression "balance essentially iron", it is not meant to exclude the presence of other alloying elements. For example, the ferro-titanium starting material may have other elements therein, such as small amounts of silicon, manganese, etc. Where it is desirable to have predetermined amounts of silicon in the ferrous matrix, this can be achieved by adding ferro-silicon. Where vanadium is employed as an alloying element, it can be added as ferro-vanadium.

The foregoing will be apparent by reference to the following examples which are illustrative of the various embodiments of the invention, it being understood that the examples are not to be construed as limiting the invention.

Example 1

A powder mixture of predetermined composition was produced using the following metal powders as starting ingredients:

Ferro-Titanium: 39.8% Ti, 0.06% Mn, 0.03% Si, 0.03% C and the balance essen-

-continued

Cast Iron: tially iron (less than 60 mesh) 3.65% C, 2.67% Si, 0.67% Mn and the balance essentially iron (less than 60 mesh)
Ferro-Silicon: 43.35% Si, 0.08% C, and the balance essentially iron (less than 60 mesh)
Graphite: Finer than 1μ
Molybdenum: About 3 microns, 99% Mo
Copper: Finer than 120 mesh, 99% Cu The mixture contained the foregoing ingredients in the following amounts:

| Ingredient | Weight (grs.) |
|---|---|
| Ferro-Titanium | 650.0 |
| Cast Iron | 205.0 |
| Ferro-silicon | 40.0 |
| Graphite | 85.0 |
| Molybdenum | 10.0 |
| Copper | 10.0 |
| | 1000.0 |

The foregoing mixture is predetermined to provide a sintered composition containing about 33% by weight of TiC (about 45 volume percent), with the ferrous matrix containing about 4% C, 3.5% Si, 0.15% Mn, 1.5% Mo and 1.5% Cu based on the weight of the matrix.

Ethyl alcohol was added to the powder mixture to form a slurry and the mixture then subjected to grinding in a vibration mill containing grinding balls. A small amount of fused paraffin was added for use as a lubricant in compacting the dried mixture in a die. After drying, the powder mixture was passed through a 100 mesh sieve and the powder compressed into a compact or briquet at a pressure of about 1 ton/cm$^2$ (about 6.5 tons/sq.inch). The compact was then sintered in vacuum in a high frequency electric furnace at an absolute pressure of about $10^{-2}$ to $10^{-1}$ mm of mercury (Hg). The temperature of the compact was raised to 1250°C and held at temperature for about 30 minutes, followed by slow cooling in the furnace. Since the reaction for forming titanium carbide appears to begin at 1100°C, the rate of heating after the temperature reaches 1100°C is controlled at less than 20°C per hour.

The specific gravity, hardness and transverse rupture strength of the resulting sintered product were 5.6, 38.5 $R_C$ and 83 Kg/mm$^2$, respectively. The microstructure obtained is shown in FIG. 1 at 150 times magnification and in FIG. 2 taken at 1500 times magnification. Referring to FIGS. 1 and 2, it will be noted that the metallographic structure shows a fine dispersion of titanium carbide grains and black graphite particles through a ferrous matrix believed to be ferrite. The grains of titanium carbide are of the order of about 1 micron. In producing FIG. 2, the specimen was etched with an alkaline solution of potassium ferricyanide containing 10% by weight of sodium hydroxide and 10% potassium cyanide.

Example 2

This example is similar to Example 1 except that a part of the ferro-titanium was replaced by a small amount of ferro-vanadium containing by weight 51.8% vanadium, 0.04% C, 0.62% Si and the balance essentially iron. The mixture produced was as follows:

| Ingredients | Weight (grs.) |
|---|---|
| Ferro-Titanium | 600.0 |
| Ferro-Vanadium | 50.0 |
| Cast Iron | 205.0 |
| Ferro-Silicon | 40.0 |
| Graphite | 85.0 |
| Copper | 10.0 |
| | 990.0 |

The sintering conditions were the same as in Example 1. The properties obtained (specific gravity, hardness and transverse rupture strength) were likewise the same. The microstructures obtained were similar to FIGS. 1 and 2, respectively. The composition contained about 30.5% TiC and the balance the ferrous matrix containing about 4% C as graphite with the remainder of the carbon in the matrix tied up as vanadium carbide, the matrix also containing about 2.5% Si, about 1.45% Cu and the balance essentially iron.

Example 3

In this example, the composition was varied slightly over Example 1 in that a small amount of nickel was added and also additional amounts of graphite as follows:

| Ingredients | Weight (grs.) |
|---|---|
| Ferro-Titanium | 650.0 |
| Cast Iron | 200.0 |
| Ferro-Silicon | 35.0 |
| Graphite | 90.0 |
| Molybdenum | 10.0 |
| Copper | 10.0 |
| Nickel | 5.0 |
| | 1000.0 |

In this instance, the compact was sintered at 1250°C for 60 minutes. The properties obtained are as follows: specific gravity 5.9, hardness 40 $R_C$ and transverse rupture strength 90 Kg/mm$^2$. The microstructure obtained in the finally sintered product is shown in FIG. 3 (×150) and FIG. 4 (×1500).

Example 4

The composition of Example 1 was modified slightly by adding a small amount of chromium for heat treatment and omitting the copper. The powder mixture was as follows:

| Ingredients | Weight (grs.) |
|---|---|
| Ferro-titanium | 650.0 |
| Cast Iron | 210.0 |
| Ferro-Silicon | 30.0 |
| Graphite | 90.0 |
| Chromium | 5.0 |
| Nickel | 5.0 |
| Molybdenum | 10.0 |
| | 1000.0 |

The compact or briquet was similarly produced as in Example 1, except that the compact was sintered at 1250°C for about 60 minutes. The following physical properties were obtained: specific gravity 5.85, hardness 41.5 $R_C$ and transverse rupture strength 95 Kg/mm$^2$. The microstructure is illustrated in FIG. 5 (×150) and FIG. 6 (×1500). The matrix contains pearlite and is capable of quench hardening. The sintered compact was heat treated by holding at 1050°C for 1 hour and quenching in oil. The hardness increased to 62.5 $R_C$. The quenched material was then tempered at 200°C for 1 hour to give a hardness of about 61 $R_C$. A second tempering was also employed at 530°C. The hardness after the second tempering was 54.0 $R_C$ and the transverse rupture strength 110 Kg/mm$^2$.

Example 5

In order to improve the self-lubricating properties of the sintered product, a composition was produced with increased graphite content as follows:

| Ingredients | Weight (grs.) |
|---|---|
| Ferro-Titanium | 650.0 |
| Cast Iron | 195.0 |
| Ferro-Silicon | 30.0 |
| Graphite | 100.0 |
| Nickel | 5.0 |
| Molybdenum | 10.0 |
| Copper | 10.0 |
| | 1000.0 |

The sintering conditions employed were the same as those of Example 3. The physical properties obtained were as follows: specific gravity 5.6, hardness $R_C$ 39 and transverse rupture strength 90 Kg/mm$^2$. The high density of graphite dispersion is shown in FIG. 7 (×150) and FIG. 8 (×1500).

As stated hereinbefore, in producing the sintered ferrous-titanium carbide product, it is preferred to use ferro-titanium as a starting ingredient, although titanium powder mixed with iron powder may be employed together with cast iron. The ferro-titanium alloy powder may range in composition from about 20% to 70% titanium and the balance essentially iron, it being understood that small amounts of other alloying elements may be present in the starting alloy.

The cast iron powder may have the following composition: about 2 to 3.75% C, about 1.5 to 3.5% Si and the balance essentially iron.

Where ferro-silicon is employed as an alloying ingredient, it may comprise about 20% to 70% Si and the balance essentially iron.

When ferro-vanadium is also employed as an alloying additive, the vanadium content may comprise 20% to 60% V and the balance essentially iron.

The sintered product produced in accordance with the invention may contain about 15% to 50% TiC, about 1% to 4.5% C substantially in the form of dispersed graphite and the balance essentially iron. As will be understood by those skilled in the art, the ferrous matrix may contain small amounts of other alloying elements and the term "balance essentially iron" is to be construed to cover such elements that may be present, such as silicon, manganese, molybdenum, copper, nickel, chromium, vanadium, and the like. A preferred sintered composition is one containing about 20% to 40% by weight of titanium carbide.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A ferrous-titanium carbide composition characterized by resistance to scuffing and wear comprising metallographically a ferrous matrix in which substantially all of the contained titanium carbide is in the form of fine precipitated grains substantially below 5 microns in size, said matrix containing particles of precipitated graphite uniformly dispersed therethrough at substantially less than 10 microns in size.

2. The ferrous-titanium carbide composition of claim 1, wherein the amount of precipitated titanium carbide ranges by weight from about 15% to 50% and the graphite from about 1% to 4.5%, and wherein the precipitated titanium carbide grains have an average size of approximately 1 micron.

3. The ferrous-titanium carbide composition of claim 2, wherein the amount of precipitated titanium carbide ranges by weight from about 20% to 40%.

4. As an article of manufacture, a scuff and wear-resistant element formed of a sintered ferrous-titanium carbide composition, said element being characterized metallographically by a ferrous matrix in which substantially all of the contained titanium carbide is in the form of fine precipitated grains substantially below 5 microns in size, said matrix containing particles of precipitated graphite uniformly dispersed therethrough at substantially less than 10 microns in size.

5. The article of manufacture of claim 4, wherein the composition of said element comprises by weight 15% to 50% of said precipitated titanium carbide grains and about 1% to 4.5% of graphite, and wherein the precipitated titanium carbide grains have an average size of approximately 1 micron.

6. The article of manufacture of claim 5, wherein the amount of precipitated titanium carbide ranges from about 20% to 40% by weight.

* * * * *